United States Patent
Ryaboy et al.

(10) Patent No.: US 6,598,545 B2
(45) Date of Patent: Jul. 29, 2003

(54) VIBRATION DAMPER FOR OPTICAL TABLES AND OTHER STRUCTURES

(75) Inventors: Vyacheslav M. Ryaboy, Irvine, CA (US); Worthington B. Houghton, Jr., Newport Beach, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 09/833,181

(22) Filed: Apr. 10, 2001

(65) Prior Publication Data

US 2002/0162489 A1 Nov. 7, 2002

(51) Int. Cl.[7] ................................................. A47B 9/02
(52) U.S. Cl. ................ 108/136; 108/57.12; 108/161
(58) Field of Search .......................... 108/136, 55.3, 108/59, 57.12; 248/638, 636

(56) References Cited

U.S. PATENT DOCUMENTS

| 1,812,861 A | * | 7/1931 | Chase |
| 3,808,983 A | * | 5/1974 | Pielkenrod |
| 3,853,075 A | * | 12/1974 | Burch |
| 4,831,681 A | * | 5/1989 | Puder |
| 4,921,202 A | * | 5/1990 | Miyake et al. |
| 5,356,110 A | * | 10/1994 | Eddy |
| 5,478,043 A | * | 12/1995 | Wakui |
| 5,716,037 A | * | 2/1998 | Haak |
| 5,765,800 A | * | 6/1998 | Watanabe et al. |
| 5,929,395 A | * | 7/1999 | Bizlewicz |
| 6,044,773 A | * | 4/2000 | Bauer |
| 6,209,841 B1 | * | 4/2001 | Houghton, Jr. et al. |
| 6,364,274 B1 | * | 4/2002 | Omi et al. |
| 6,371,434 B1 | * | 4/2002 | Becker et al. |

FOREIGN PATENT DOCUMENTS

JP 332206 * 11/2001

* cited by examiner

Primary Examiner—Jose V. Chen
(74) Attorney, Agent, or Firm—Irell & Manella LLP

(57) ABSTRACT

A table that includes a damper attached to a first faceplate and a second faceplate. The damper can dampen flexural loads introduced to the table by either shock or vibration. The damper may include a damping layer that is attached to a first plate and a second plate. The first plate may be cantilevered from the first faceplate. The second plate may be cantilevered from the second faceplate.

15 Claims, 4 Drawing Sheets

VIBRATION DAMPER FOR OPTICAL TABLES AND OTHER STRUCTURES

BACKGROUND OF THE INVENTION

1. Field of the Invention

The present invention relates to a table with an integral damping element.

2. Background Information

There have been developed honeycomb metal tables that can be used for various industrial applications. For example, U.S. Pat. No. 4,621,006 issued to Terry et al. discloses a metal honeycomb table that has a plurality of threaded apertures in the top surface of the table. The threaded apertures allow optical components to be attached to the table. Such a table is commonly referred to as an optical test bench.

Optical test benches are used to perform tests and experiments for optical systems. The tables are typically placed on the floor of a laboratory facility. Most commercial building structures have a natural tremor or vibration. The vibration may be transferred to the table and create an undesirable movement of the optical system.

There are optical tables that have some type of damping device or element to attenuate vibration introduced to the table. For example, U.S. Pat. No. 5,433,302 issued to Heide, discloses a honeycomb table that has a tuned damper integrated into the table. The tuned damper includes a manually adjustable spring. The deflection of the spring can be varied to change the frequency range attenuated by the damper. Tuned dampers provide attenuation over a narrow band of vibration frequency. The spring must be manually adjusted to tune the table to a desired frequency range. The adjustment process typically requires a trained operator to vary the spring length and tune the table to a desired frequency range.

There are also individual tables with integral passive damping elements that provide broadband damping. Although the broadband dampers cover a broad frequency spectrum, the amount of attenuation is less than a tuned damper. It would be desirable to provide a table damper that can provide a desired amount of attenuation over a relatively broad frequency spectrum.

BRIEF SUMMARY OF THE INVENTION

One embodiment of the present invention is a table that has a damper attached to a first table element and a second table element. The damper may have a first plate only attached to the first table element and a second plate only attached to the second table element. A damping layer may be attached to the first and second plates. The damping layer may be displaced in a shear direction when the table moves in a flexural manner.

DETAILED DESCRIPTION OF THE PREFERRED EMBODIMENT

In the general the present invention includes a table that includes a damper attached to a first table element and a second table element. The damper can dampen flexural loads introduced to the table by either shock or vibration. Flexural loads include shear, bending and torsional loads. The damper may include a damping layer that is attached to a first plate and a second plate. The first plate may be cantilevered from the first table elements. The second plate may be cantilevered from the second table elements.

Figure 1:
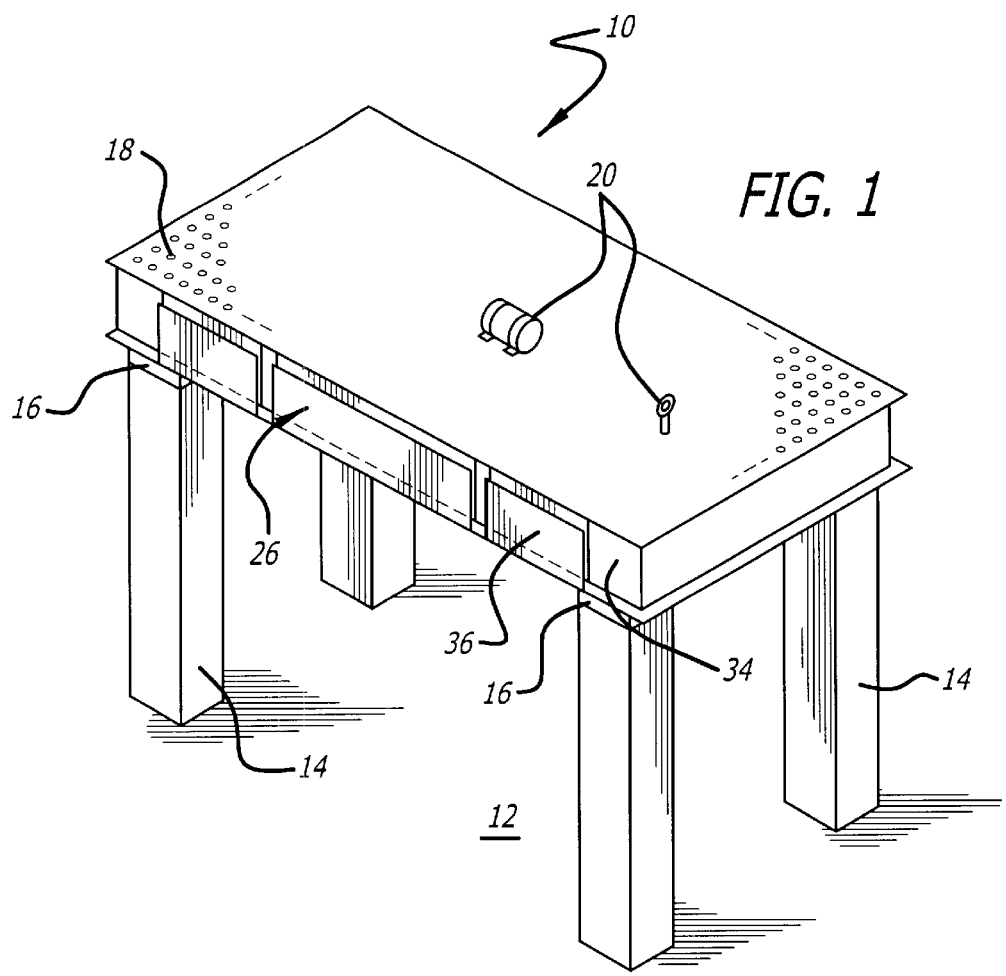
FIG. 1 is a perspective view of an embodiment of a table of the present invention.

Referring to the drawings more particularly by reference numbers, FIG. 1 shows an embodiment of a table 10 of the present invention. The table 10 may be supported from a floor 12 by a plurality of legs 14. The legs 14 may be coupled to active or passive vibration control modules 16.

The table 10 may include a plurality of threaded apertures 18. Devices such as optical mounts 20 may be attached to the table 10 at the apertures 18. Although an optical test bench is shown and described, it is to be understood that the table 10 can be used for other applications.

Figure 2:
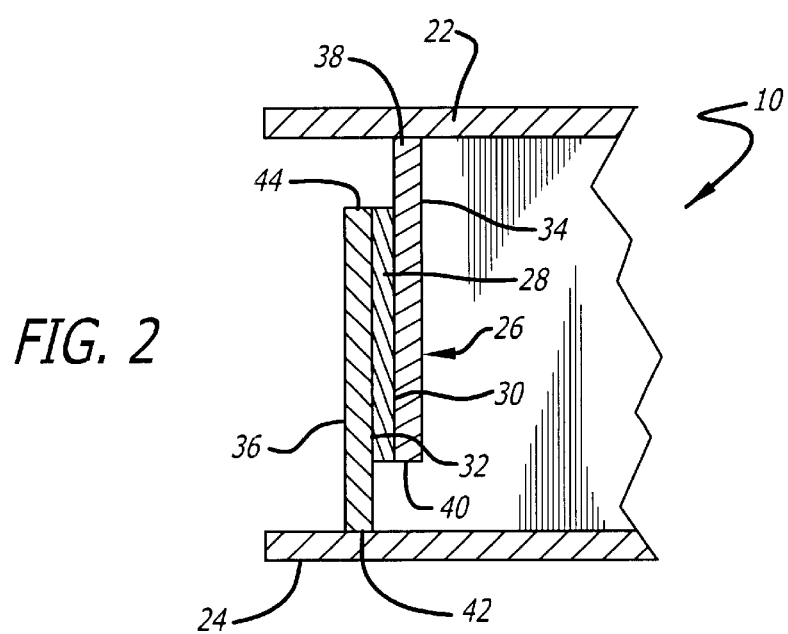
FIG. 2 is a cross-sectional view showing a damper of the table.

As shown in FIG. 2, the table 10 may include a first faceplate 22 and a second faceplate 24. The faceplates 22 and 24 maybe constructed from a metal material such as aluminum. The table 10 further has a damper 26 that is attached to the first 22 and second 24 faceplates. The damper 26 may include a damping layer 28 that is attached to opposing first surfaces 30 and 32 of a first plate 34 and a second plate 36, respectively. The first plate 32 may have a first end 38 that is attached to the first faceplate 22 and an unattached second end 40. Likewise, the second plate 36 may have a first end 42 that is attached to the second faceplate 24 and an unattached second end 44. The damping layer 28 is preferably constructed from a visco-elastic material that will absorb vibrational energy.

Figure 3:
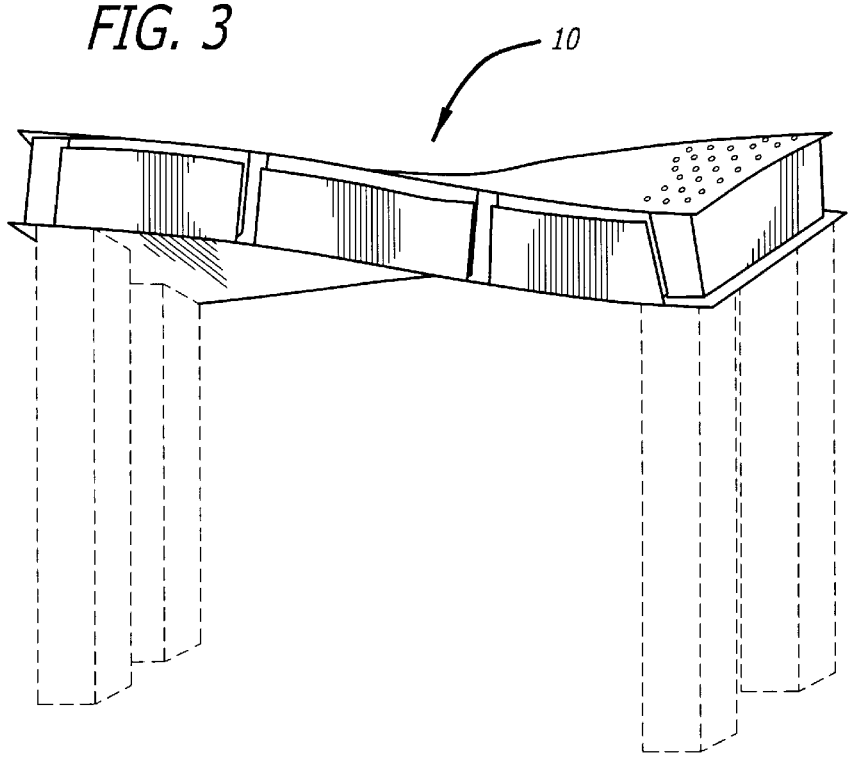
FIG. 3 is a perspective of the table having a torsional movement.
Figure 4:
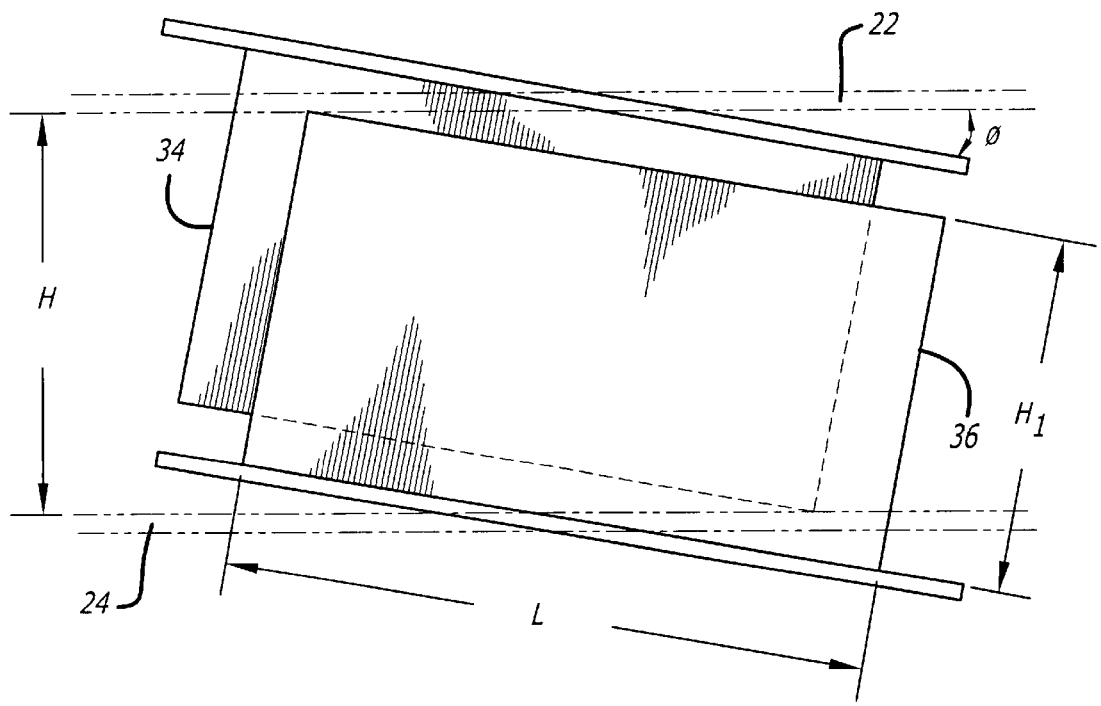
FIG. 4 is an illustration showing movement of the damper.

As shown in FIGS. 3 and 4, the table 10 may undergo a flexural movement, such as torsional or bending movement, that cause rotational movement within the table 10. The movement may be induced by an external shock or vibrational load. Rotation of the faceplates 22 and 24 will create a shear deformation of the damping layer 28. The energy dissipated by the damping layer 28 can be defined by the following equation.

$$E = \pi \cdot \eta \cdot G \cdot W \cdot L \cdot \frac{H^2}{t} \cdot \varnothing^2 \quad (1)$$

Where;

E=the energy dissipated by damping layer.
η=a loss factor.
G=the shear modulus of the damping material.
H=the distance between the faceplates.
W=the width of the damping material.
L=the length of the damping material.
t=the thickness of the damping material.
Ø=the rotation of the faceplates.

The aspect ratio of the damping material is such that the material will primarily undergo a shear movement when the faceplates experience rotation due to torsion or bending movements of the table. As shown by equation 1 the energy dissipated is a squared function of the distance between the faceplates H and inverse function of the thickness t of the damping material. The damper of the present invention thus provides a high attenuation of vibration energy in the table. Additionally, the damper 26 can be configured to provide large attenuation over a relatively broad frequency range.

Figure 5A:
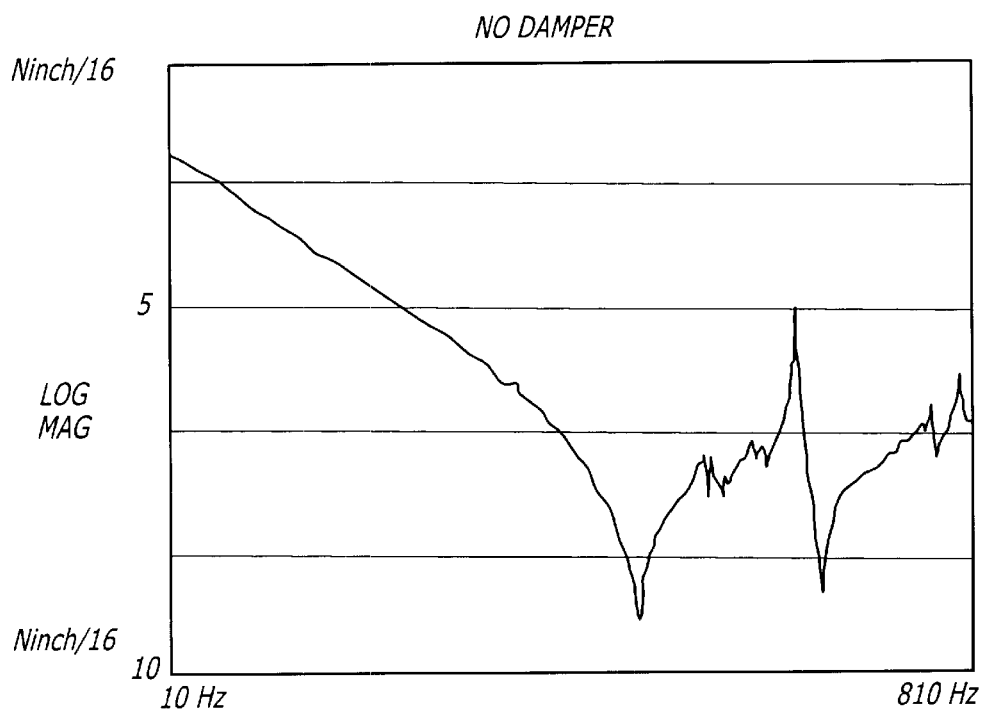
FIGS. 5a–b are graphs showing attenuation of a table with and without the damper.
Figure 5B:
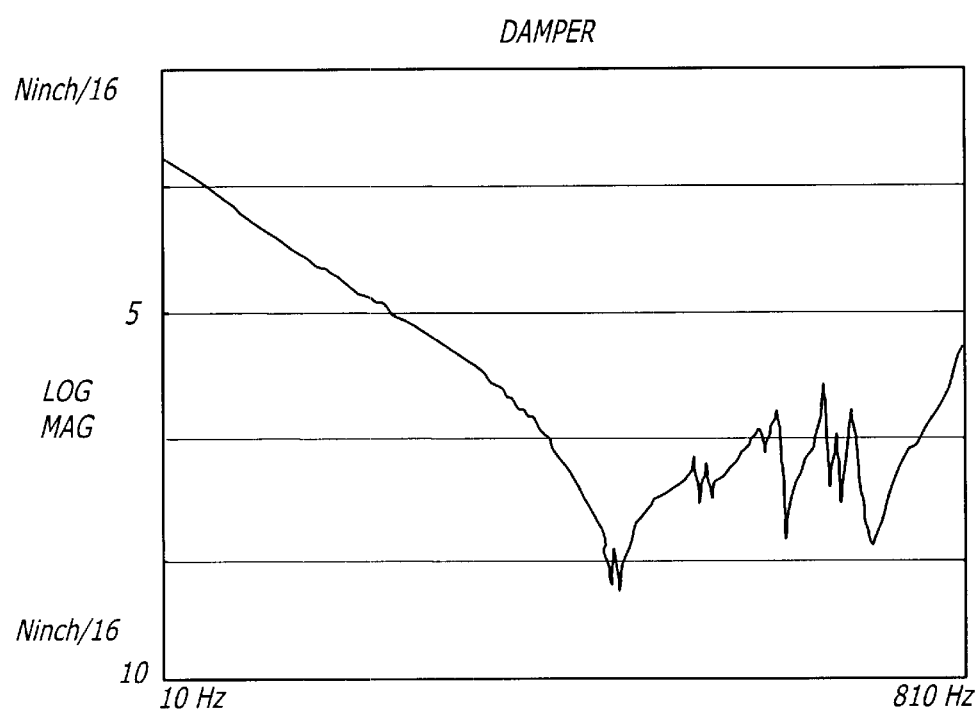

FIGS. 5a and 5b show the attenuation of a table 10 without a damper (FIG. 5a) and with the damper 26 of the present invention (FIG. 5b). As can be seen the damper 26 will attenuate a load over a relatively broad frequency range. The damper 26 can be configured to provide the greatest attenuation at frequency modes typically applied to the table 10.

Referring to FIGS. 1 and 2, the damper 26 may include a plurality of first plates 36, second plates 34 and damping layers 28 attached to the outer edges of the faceplates 22 and 24. The damper 26 can thus function as both a damping element and an outer edge wall for the table 10.

The plates 36 and 34 and damping layers 28 can be incorporated into the table 10 in different configurations to attenuate various torsional and bending modes. By way of example, positioning two dampers along the middle of the long edges of the table will dampen a first torsion mode. Placing four smaller dampers adjacent to the corners of the table within ⅓ of the table length will dampen a first bending mode. Dampers can be placed at various locations to dampen various torsion and bending modes.

Figure 6:
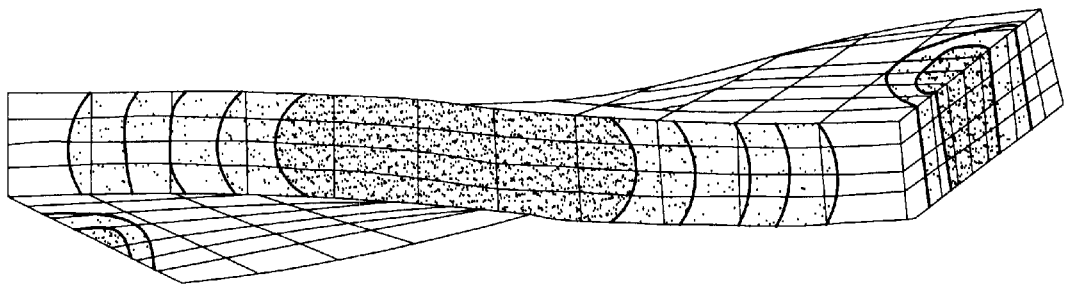
FIG. 6 is an illustration showing shear deformation of a table in a torsional vibration mode.
Figure 7:
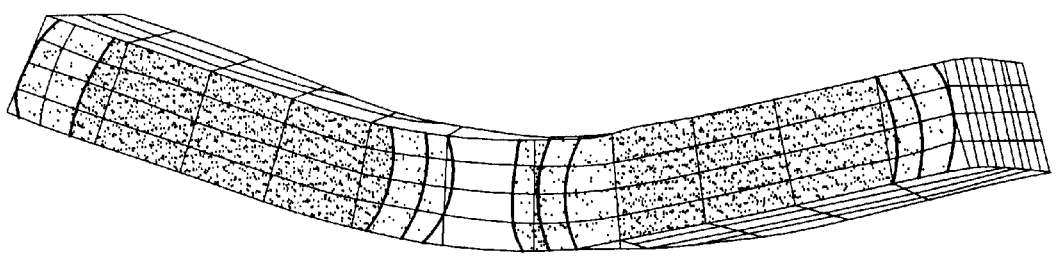
FIG. 7 is an illustration showing shear deformation of a table in a bending vibration mode.

FIGS. 6 and 7 provide a finite element model showing shear deformation of a table in torsional and bending vibrational modes. The darker portions depict the table areas with the largest shear deformation. As shown in FIG. 6 the largest shear deformation due to torsion occurs in the center of the table sides. FIG. 7 shows the locations of largest shear for bending.

To obtain optimum damping it is desirable to place the dampers 26 at the areas of maximum shear. It can be seen that the dampers 26 shown in FIG. 1 correspond to the darker areas shown in FIGS. 6 and 7.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although a table is shown, it is to be understood that the dampers 26 can be incorporated into other structures such as a table frame. The dampers may be incorporated into the beams of the frame.

What is claimed is:

1. A table structure, comprising:
   a first table element;
   a second table element;
   a damper coupled to said first and second table elements, said damper includes a first plate with a first edge attached to said first table element and a second edge unattached to said second table element in a cantilevered manner, a second plate with a first edge attached to said second table element and a second edge unattached to said first table element in a cantilevered manner, and a damping layer attached to said first and second plates.

2. The table of claim 1, wherein said damping layer is constructed from a visco-elastic material.

3. The table of claim 1, wherein said damper is attached to an outer edge of said first and second table elements.

4. The table of claim 1, wherein said first table element is a first faceplate and said second table element is a second faceplate.

5. The table of claim 1, wherein said damping material has an aspect ratio such that said damping material will primarily undergo a shear movement when first and second table elements experience a rotational movement.

6. The table of claim 1, wherein said first faceplate includes a plurality of apertures.

7. A table, comprising:
   a first faceplate;
   a second faceplate;
   damper means for moving in a shear direction when said first and second faceplates experience a rotational movement.

8. The table of claim 7, wherein said damper means includes a first plate with a first edge attached to said first faceplate and a second edge unattached to said second faceplate, a second plate with a first edge attached to said second faceplace and a second edge unattached to said first faceplate, said first and second plates being attached to said damping layer.

9. The table of claim 8, wherein said damping layer is constructed from a visco-elastic material.

10. The table of claim 7, wherein said damper means is attached to an outer edge of said first and second faceplates.

11. The table of claim 7, wherein said first faceplate includes a plurality of apertures.

12. A method for designing a table, comprising;
   identifying areas of maximum shear movement in a table undergoing a flexural vibration mode; and
   placing a damper at each area of maximum shear movement wherein the damper moves in a shear direction when the table experiences a rotational movement.

13. The method of claim 12, wherein the vibration mode is torsional.

14. The method of claim 12, wherein the vibration mode is bending.

15. The method of claim 12, wherein the damper will primarily undergo a shear movement.

* * * * *